United States Patent Office 3,131,146
Patented Apr. 28, 1964

3,131,146
METHOD FOR INCREASING THE PRODUCTIVITY OF A FORMATION PENETRATED BY A WELL
Edward J. Griffith, Ellisville, Mo., assignor to Monsanto Chemical Company, St. Louis, Mo., a corporation of Delaware
No Drawing. Filed Sept. 13, 1957, Ser. No. 685,358
12 Claims. (Cl. 252—8.55)

The present invention relates to well-treating compositions and, more particularly, it is directed to compositions useful for the hydraulic fracturing of formations in oil wells, gas wells, water production wells, and water-injection wells. In addition, the properties of the compositions are such that they are useful for acidizing calcareous formations as well.

The practice of creating new flow channels and crevices by hydraulic fracturing has become widespread and has proven of great value in stimulating the production of fluids from all types of well formations. In the art of fracturing wells, a special fluid, commonly called a fracturing fluid, is usually pumped down the well into contact with the formation to be fractured and the pressure of the fluid composition is increased until the formation is ruptured by hydraulic pressure. It is then usually desirable to incorporate a propping material, such as sand, in the fracturing fluid, whereby the sand is carried into the fracture with the fracturing fluid. After the fracture has been extended to the extent desired, the pressure in the well bore is decreased and the fracturing fluid flows back into the well bore. At least a portion of the propping material is deposited in the fracture for maintaining it open and enhancing the flow of formation fluids through the fracture into the well bore.

The characteristics required of fracturing fluids have become fairly well known. The type of fracture obtained is dependent to a large extent upon the penetrating characteristics of the fracturing fluid, i.e., the radius of fracture is influenced by the fluid loss characteristics of the fracturing fluid. Fracturing fluids giving the most desirable type of fractures are those with low penetration characteristics or low filtration-rates. Another important consideration is the viscous character of the fluid. In certain cases it is necessary that the viscosity be lowered sufficiently after a period of time so as to prevent the fluid from blocking the produced fracture and to facilitate removal of the fracturing liquid. Since the fracturing medium normally carries a propping agent such as sand, the typical fracturing fluids must also possess sufficient viscosity and gel strength to support the granular propping agent while keeping a low coefficient of friction. In addition, the fluid should require, for economic reasons, only relatively inexpensive components and it should be easy to prepare in the field.

It is the object of this invention to provide aqueous well-treating or fracturing fluid compositions which substantially meet all of the foregoing requirements and possess all the desired properties. Other objects and advantages of the invention will become apparent from the following description thereof.

The composition of the invention is a composition having a low filtration rate comprising an aqueous dispersion of a cross-linked Kurrol's salt.

As used throughout this specification and claims, any reference to either a Kurrol's salt or a cross-linked Kurrol's salt is meant to be a cross-linked Kurrol's salt having a $K_2O:P_2O_5$ ratio of less than 1.

The following examples are presented to illustrate the invention but are not to be construed as limiting it in any manner except as it is limited in the appended claims.

EXAMPLE I

Potassium Kurrol's salt was ground by running it once through a hammer mill. This resulted in a very light fluffy mass resembling cotton. Portions of the desired quantity of the Kurrol's salt and sodium hexametaphosphate (manufactured under the trade name of "Calgon") were weighed separately in the desired ratio and mixed by stirring them in a beaker. Various amounts of this mixture required to give the different conc. tested were then weighed out. About 300 cc. of distilled water was measured into a container and placed on a high speed mixer (Hamilton-Beach). While mixing for 30 seconds the salt-solubilizer mixture was slowly added. The container was then removed from the mixer and mixed for another 35 seconds. The container was removed from the mixture and allowed to stand for 15 minutes. During this time, five-minute viscosity readings were taken using a Fann viscosimeter and the dial readings for this instrument were tabulated.

Readings were made in ascending rates of shear (3, 6, 100, 200, etc.) at approximately 20-second intervals.

After an aging period of 15 mins., the dispersion was transferred to a standard filter press and filtered under 100 p.s.i.g. of nitrogen through a No. 50 Whatman filter paper according to the test procedure described in the Standard Field Procedure for Testing Drilling Fluids, Section IV, API Test RP 29, May 1950. In Table I there are presented the viscosity and fluid loss data for compositions containing the indicated proportions of mixtures of potassium Kurrol's salt and the solubilizer, sodium hexametaphosphate.

Table I

| Ratio, K-Kurrol's Salt: $(NaPO_3)_6$ | Total Conc., g./600 cc. $H_2O$ | Fluid Loss, cc. in 30-min. API | Viscosity 300 r.p.m. (cp.) | Viscosity 600 r.p.m. (cp.) |
|---|---|---|---|---|
| 6:3 | 0.8 | 43.2 | 7.5 | 5.8 |
|  | 1.0 | 39.6 | 8.5 | 6.5 |
|  | 1.2 | 32.0 | 9.5 | 7.4 |
|  | 1.6 | 30.3 | 13.5 | 9.8 |
|  | 2.0 | 27.7 | 15.5 | 13.5 |
|  | 2.4 | 26.7 | 16.0 | 14.5 |
| 6:5 | 0.8 | 43.5 | 7.5 | 5.5 |
|  | 1.0 | 33.3 | 8.5 | 7.0 |
|  | 1.2 | 35.3 | 9.5 | 7.5 |
|  | 1.6 | 29.8 | 12.5 | 9.3 |
|  | 2.0 | 23.8 | 14.0 | 11.0 |
|  | 2.4 | 21.8 | 18.5 | 15.0 |
| 6:7 | 0.8 | 45.3 | 7.0 | 5.5 |
|  | 1.0 | 41.3 | 8.0 | 6.3 |
|  | 1.2 | 37.4 | 10.0 | 7.5 |
|  | 1.6 | 33.2 | 11.5 | 9.2 |
|  | 2.0 | 25.7 | 13.5 | 11.5 |
|  | 2.4 | 25.8 | 16.0 | 13.5 |
| 6:9 | 0.8 | 40.7 | 6.5 | 4.8 |
|  | 1.0 | 39.7 | 7.5 | 5.2 |
|  | 1.2 | 31.0 | 8.5 | 6.3 |
|  | 1.6 | 26.7 | 9.5 | 7.0 |
|  | 2.0 | 24.3 | 10.0 | 8.8 |
|  | 2.4 | 22.7 | 11.5 | 11.0 |

EXAMPLE II

Following the procedure of Example I, several mixtures of potassium Kurrol's salt and sodium chloride as the solubilizer were composited and the aqueous fluids were tested. Data obtained are presented in Table II.

Table II

| Ratio, K-Kurrol's Salt: NaCl | Total Conc., g./600 cc. $H_2O$ | Fluid Loss, cc. in 30-min. API | Viscosity 300 r.p.m. (cp.) | Viscosity 600 r.p.m. (cp.) |
|---|---|---|---|---|
| 6:1 | 0.7 | 77.8 | 5 | 4 |
| 6:1.5 | 0.75 | 84.8 | 5.5 | 4.4 |
| 6:2 | 0.8 | 62.8 | 6 | 4.8 |
| 6:3 | 0.9 | 101.8 | 5.5 | 4.4 |

The compositions described in Examples I and II degrade to form a completely soluble material with time, the rate depending on temperature and pH. The highest viscosities are obtained at a pH in the range from 6.5 to 7.0. In this pH range, the viscosity half-life is 80–85 hours at 25° C. and about 30 minutes at 50° C. Extremely high or low pH results in very rapid degradation. Thus the time required for degradation at a given temperature may be controlled by variation of pH. Data are given in Table III below for the hydrolysis of Kurrol's salt dispersions in water at an aging temperature of 140° F. using a K-Kurrol's salt: $Na_4P_2O_7$ ratio of 1:1.

*Table III*

| Conc., g./100 g. $H_2O$ | Initial Viscosity, 600 r.p.m. (cp.) | Final Viscosity | | |
|---|---|---|---|---|
| | | After 24 hr., 600 r.p.m. (cp.) | After 48 hr., 600 r.p.m. (cp.) | After 168 hr., 600 r.p.m. (cp.) |
| 4 | 28 | 4.0 | 2.0 | 2.0 |
| 6 | 36.5 | 4.5 | 2.0 | 2.0 |
| 8 | 52 | 6.0 | 3.0 | 2.0 |
| 10 | 62 | 7.0 | 4.0 | 2.5 |
| 12 | 70 | 10.0 | 5.0 | 3.0 |
| 14 | 101 | 12.5 | 6.0 | 3.0 |

As a practical application of the invention, an oil well is completed using the low fluid-loss medium of the invention as follows:

The aqueous cross-linked Kurrol's salt dispersion is pumped into the well through suitable tubing or casing to the elevation of a producing formation at a substantially constant rate. Sand or some other propping agent is usually incorporated in the fracturing fluid as it is pumped into the well. The sand or other agent is suspended in the fracturing fluid by virtue of the viscosity of the fluid and thus is carried into the fracture when the low-penetrating fluid enters the formation. Upon the release of pressure, the sand holds open the fracture to its maximum height and provides a more permeable path for fluid flow. Pumping or injection of the dispersion into the well is continued after the low-penetrating fluid reaches the selected formation thus causing the bottom hole pressure to rise until the hydrostatic bottom-hole pressure is sufficient to cause the formation to part or fracture. Fluid pressure measurements are continuously made at the surface and when fracture occurs the surface pressure decreases. Continued injection of the fluid into the fracture will extend the fracture radially. The pressure required to fracture the formation, commonly termed the "formation breakdown pressure," is roughly equivalent in pounds per square inch to the depth of the formation in feet.

After the desired fracture is effected, the well is allowed to stand idle for 24 to 48 hours to permit hydrolysis of the Kurrol's salt to a soluble material thus substantially reducing the viscosity of the fracturing liquid. Thereafter, the well is placed back on production.

Alternatively, if time is an important consideration and it is not desired to permit the well to stand idle for any length of time, either a strongly acidic or basic material can be introduced into the well which will alter the pH of the dispersion and substantially increase the rate of hydrolysis of the Kurrol's salt so that degradation with the accompanying decrease in viscosity is very rapid. Concentrated hydrochloric acid, for example, or a concentrated caustic solution will achieve this effect. A slowly soluble acid phosphate may also be injected with the fracturing fluid. Various sequestering agents may also be added.

Any cross-linked Kurrol's salts, such as the alkali metal and alkaline earth metal cross-linked Kurrol's salts, can be used to prepare the aqueous dispersions useful in the practice of the process of this invention. Sodium, potassium, lithium, barium, calcium, etc., cross-linked Kurrol's salts are specific examples of cross-linked Kurrol's salts useful in this invention. The concentration of the cross-linked Kurrol's salts in the aqueous dispersion thereof can be varied substantially and the choice of concentration is dependent upon the end properties desired. The aqueous dispersions can contain as low as 0.5% by weight of the cross-linked Kurrol's salts and as high as approximately 25% of the cross-linked Kurrol's salts. Concentrations ranging from about 2% to about 15% by weight of Kurrol's salts are particularly useful. In certain cases, it is particularly desirable and advantageous to employ in the aqueous dispersion a solubilizing agent for the cross-linked Kurrol's salts. Any soluble compound containing a monovalent cation different from that of the Kurrol's salts can be employed as a solubilizing agent. Suitable materials include, for example, molecularly dehydrated phosphates such as hexametaphosphates, pyrophosphates, acid pyrophosphates and phosphate glasses. The sodium, potassium, lithium and ammonium salts of these phosphates are particularly useful. The alkali metal and ammonium chlorides, carbonates, silicates, lignosulfonates and alkylbenzene sulfonates are also useful. The quantity of solubilizer used in the dispersion will depend upon the particular Kurrol's salts used and when used is generally used in an amount at least sufficient to facilitate dispersion of the Kurrol's salt.

The fracturing fluid of the invention may be used as such as described or it may be incorporated as an additive to impart increased viscosity and/or reduced fluid loss in any water-base fluid used for hydraulic fracturing.

It is particularly useful also for acidizing formations. It is very difficult in most calcareous formations to obtain formation break-down pressures with acid solutions. The acid merely filters through the permeable strata immediately adjacent the well thus obviating the production of deep channels to the well. However, if the low-penetrating fluid of the invention is incorporated in the acid to render it more viscous and impart to it a low filtration rate, it will not readily penetrate the pores of the formation when injected into the well. Pressure can then be exerted on the acidizing solution to fracture the formation and displace the acid back through the resulting fracture. A sufficient quantity of acid can then be injected into the formation to react with the calcareous material and enlarge the flow channels. Or, prior to acidization of calcareous formations, the fracturing fluid of the invention may be injected into the formation according to the procedure described above for fracturing the formation. Following this fluid, either directly or indirectly, a strong mineral acid solution may be pumped into the fracture. Enough of the acid is used to break down by hydrolysis the cross-linked Kurrol's salt as well as to permit reaction of the acid with the calcareous formation thereby increasing permeability in and adjacent to the fracture. The fracturing fluid of the invention is as useful in fracturing formations in water-production, water-injection and gas wells as it is in the fracturing of oil wells.

What is claimed is:

1. A method for increasing the productivity of a formation penetrated by a well which comprises introducing a dispersion containing from about 0.5 to 25% by weight of a cross-linked Kurrol's salt in water into a confined zone of said well adjacent said formation, and applying a pressure to said aqueous dispersion sufficient to fracture said formation and displace at least a part of said dispersion into said formation.

2. The method as described in claim 1, wherein the cross-linked Kurrol's salt is a cross-linked alkali metal Kurrol's salt.

3. The method as described in claim 2, wherein the cross-linked alkali metal Kurrol's salt is the potassium salt.

4. The method as described in claim 2, wherein the cross-linked alkali metal Kurrol's salt is the sodium salt.

5. A method for increasing the productivity of a formation penetrated by a well which comprises introducing a dispersion containing from about 0.5 to 25% by weight of a cross-linked Kurrol's salt together with a solubilizer therefor in water into a confined zone of said well adjacent said formation, and applying a pressure to said aqueous dispersion sufficient to fracture said formation and displace at least a part of said dispersion into said formation.

6. The method as described in claim 5, wherein the cross-linked Kurrol's salt is a cross-linked alkali metal Kurrol's salt.

7. A method for increasing the productivity of a formation penetrated by a well which comprises introducing an aqueous dispersion containing from about 0.5 to 25% by weight of a cross-linked Kurrol's salt and a salt of a molecularly dehydrated phosphate containing a monovalent cation different than that of said Kurrol's salt, said phosphate being a solubilizer for said Kurrol's salt, into a confined zone of said well adjacent said formation, and applying a pressure to said aqueous dispersion sufficient to fracture said formation and displace at least a part of said dispersion into said formation.

8. The method as described in claim 7, wherein the cross-linked Kurrol's salt is the potassium salt and the solubilizer is the sodium salt of a molecularly dehydrated phosphate.

9. The method as described in claim 7, wherein the cross-linked Kurrol's salt is a cross-linked alkali metal Kurrol's salt.

10. The method as described in claim 9, wherein the alkali metal Kurrol's salt is the sodium salt.

11. The method as described in claim 9, wherein the alkali metal Kurrol's salt is the potassium salt.

12. A method for increasing the productivity of a formation penetrated by a well which comprises introducing a composition consisting of from about 0.5 to 2% by weight of a Kurrol salt dissolved in water into a confined zone of said well adjacent said formation, and applying a pressure to said composition sufficient to fracture said formation and displace at least a part of said composition into said formation.

References Cited in the file of this patent

UNITED STATES PATENTS

| | | |
|---|---|---|
| 2,557,109 | Iler et al. | June 19, 1951 |
| 2,596,137 | Fast | May 13, 1952 |
| 2,596,843 | Farris | May 13, 1952 |

FOREIGN PATENTS

| | | |
|---|---|---|
| 886,650 | France | July 12, 1943 |
| 901,040 | France | Oct. 23, 1944 |

OTHER REFERENCES

Coulter: Chemical Additives, Production Sec. World Oil, February 1, 1957, pp. 148, 149, 152, 157, 158.